(12) United States Patent
Holden

(10) Patent No.: US 7,374,141 B2
(45) Date of Patent: May 20, 2008

(54) J-CLIP

(76) Inventor: David Holden, 2830 Vanderberg Ave., Columbus, OH (US) 43204

( * ) Notice: Subject to any disclaimer, the term of this patent is extended or adjusted under 35 U.S.C. 154(b) by 0 days.

(21) Appl. No.: 10/671,300

(22) Filed: Sep. 24, 2003

(65) Prior Publication Data
US 2005/0061943 A1 Mar. 24, 2005

(51) Int. Cl.
A44B 1/18 (2006.01)
A47G 29/00 (2006.01)

(52) U.S. Cl. .................. 248/205.2; 248/301; 248/690; 404/73; 428/99

(58) Field of Classification Search ............ 248/309.1, 248/300, 301, 304, 205.1, 311.2, 339, 690, 248/322, 205.2, 205.3, 215, 214, 500, 311; 428/98–100; 404/17, 18, 73
See application file for complete search history.

(56) References Cited

U.S. PATENT DOCUMENTS

| 4,782,883 | A | * | 11/1988 | Braiotta | 160/368.1 |
|---|---|---|---|---|---|
| 4,951,910 | A | * | 8/1990 | March | 248/311.2 |
| 5,037,051 | A | * | 8/1991 | Moriello | 248/215 |
| 5,269,484 | A | * | 12/1993 | Jones | 248/172 |
| 6,073,899 | A | * | 6/2000 | Omrani | 248/311.2 |
| 6,149,229 | A | * | 11/2000 | Dillon et al. | 297/188.2 |
| 6,663,158 | B1 | * | 12/2003 | Showalter | 296/96.21 |
| 6,672,621 | B1 | * | 1/2004 | Moss | 281/36 |
| 6,742,757 | B2 | * | 6/2004 | Fox | 248/538 |
| 2005/0061943 | A1 | * | 3/2005 | Holden | 248/500 |
| 2006/0039754 | A1 | * | 2/2006 | Linville | 404/73 |

* cited by examiner

Primary Examiner—Carl D. Friedman
Assistant Examiner—Tan Le

(57) ABSTRACT

A clip including two plates that preferably are substantially parallel, a spacer that connects the plates and that holds the plates apart by a gap, and at least one part of a hook-and-loop fastener attached to at least one of the plates opposite the other of the plates. Also, a clip including a plate, one or more structures for fastening the plate to an object, and at least one part of a hook-and-loop fastener attached to the plate. In addition, a method of using such clips.

7 Claims, 6 Drawing Sheets

J-CLIP

BACKGROUND OF THE INVENTION

1. Field of the Invention

This invention relates to a J-clip that includes at least part of a hook-and-loop type fastener.

2. Description of the Related Art

It is often necessary or useful to secure a cover, sheet, drape, curtain, board, screen, tarp, or some other item to a structure of some type. However, in many instances, the structure does not have any convenient hardware for attaching the item.

One example is when ice in a hockey arena or ice rink needs to be covered, for instance with artificial turf. An ice cover typically is placed over the ice, and then the turf is placed over the ice cover. However, a problem often arises with this typical arrangement. In particular, the turf tends to slide on the ice cover. This sliding can lead to bulges and uneven spots on the turf, especially where two or more pieces of turf meet at a seam. This situation is illustrated in FIGS. 1 and 2.

In FIG. 1, ice cover 1 is placed over ice 2. Turf 3 is placed over ice cover 1 and has slid up against dasher 4, creating bulges 5. FIG. 2 illustrates that bulges are also likely to form along seam 6. Other bulges can form at other locations on the turf. These bulges can be inconvenient and even hazardous to people walking on turf 5.

Many other situations exist where a cover, sheet, drape, curtain, board, screen, tarp, or some other item typically is situated in place without being securely fastened. Some apparatus that helps to prevent sliding once the item is in place would be very useful.

SUMMARY OF THE INVENTION

Accordingly, one aspect of the invention is a J-clip that can be used to secure an item in place. The J-clip includes two plates that preferably are substantially parallel, a spacer that connects the plates and that holds the plates apart by a gap, and at least one part of a hook-and-loop (e.g., Velcro® brand) fastener attached to at least one of the plates opposite the other of the plates.

In use, the J-clip(s) can be placed on a floor, deck, cover, roof, board, truss, pipe, sign, bridgework, or any other structure, and then the hook-and-loop type fastener can be used to attach something else to the J-clip(s).

In the hockey arena context, J-clips can be placed on the ice cover. Then, matching hook-and-loop fasteners can be affixed to the turf, and the turf can be attached to the J-clips. In this context, it is useful to use J-clips with a rubberized coating on the surface opposite the hook-and-loop type fastener. This rubberized coating can help slow ice melt from contact with the J-clips.

The plates and spacer can be formed from a single piece of material such as a steel plate. Alternatively, the plates and spacer can be formed from separate pieces of material joined together, for example by welding.

Preferably, the two plates are square or rectangular shaped, although any shape can be used. The two plates can be differently sized from each other or the same size as each other.

The two plates preferably each have a surface area of several inches, and the spacer preferably connects the two plates at an edge of each plate. The spacer can be flat, curved in a semi-circle (with the inside of the semi-circle toward the gap), or any other shape. In the preferred embodiment, the spacer holds the two plates so that the gap is one or more inches. Smaller or larger gaps can be used. In addition, the size of the gap can be fixed or adjustable.

In one embodiment, the J-clip is held in place by friction or gravity or by a tight fit. Alternatively, the spacer can include one or more holes that can be used to secure the J-clip using nails or bolts.

Another embodiment of the invention is a clip that includes a plate, one or more structures for fastening the plate to an object, and at least one part of a hook-and-loop fastener attached to the plate.

The invention also encompasses methods of using J-clips according to the invention.

This brief summary has been provided so that the nature of the invention may be understood quickly. A more complete understanding of the invention may be obtained by reference to the following description of the preferred embodiments thereof in connection with the attached drawings.

DESCRIPTION OF THE PREFERRED EMBODIMENT

Figure 1:
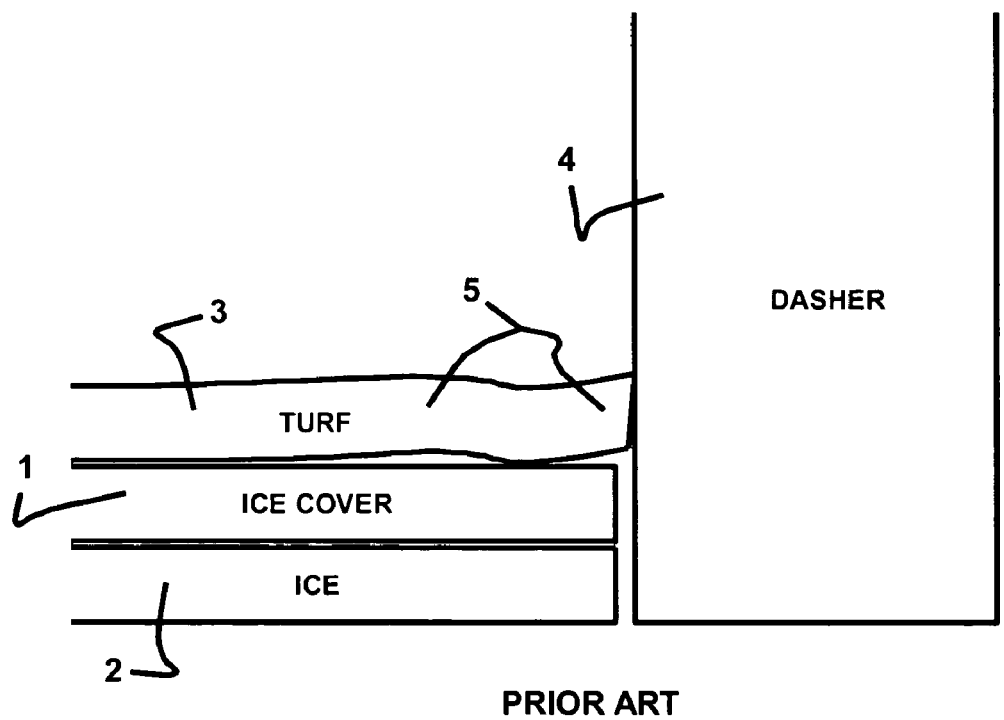
FIGS. 1 and 2 show a conventional arrangement in which turf placed on an ice cover can slide out of place, leading to unevenness and bulging.
Figure 2:
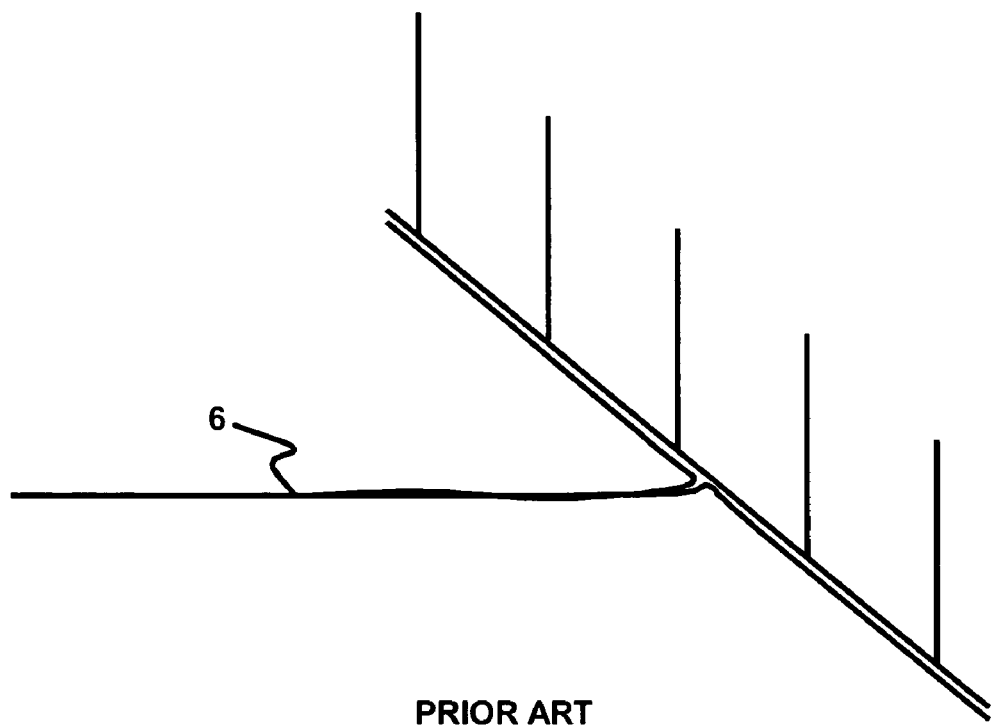
Figure 3:
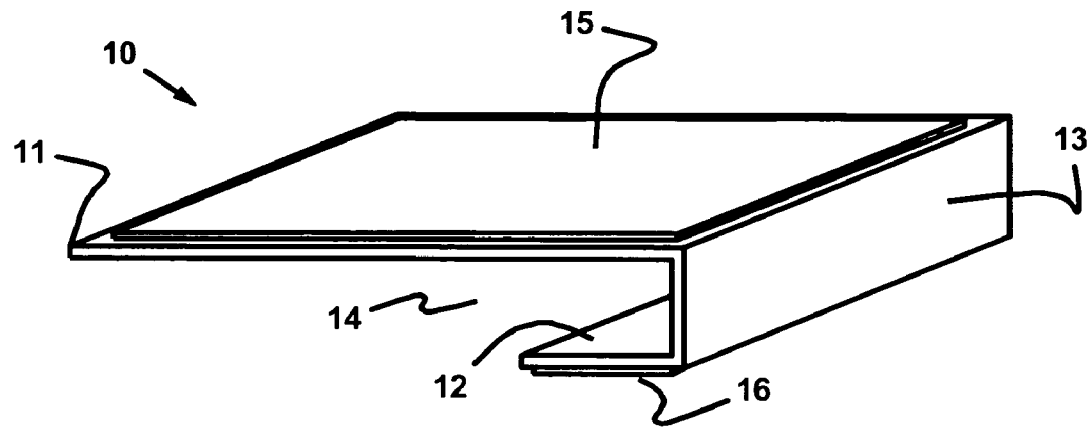
FIGS. 3 and 4 show embodiments of a J-clip according to the invention.
Figure 4:
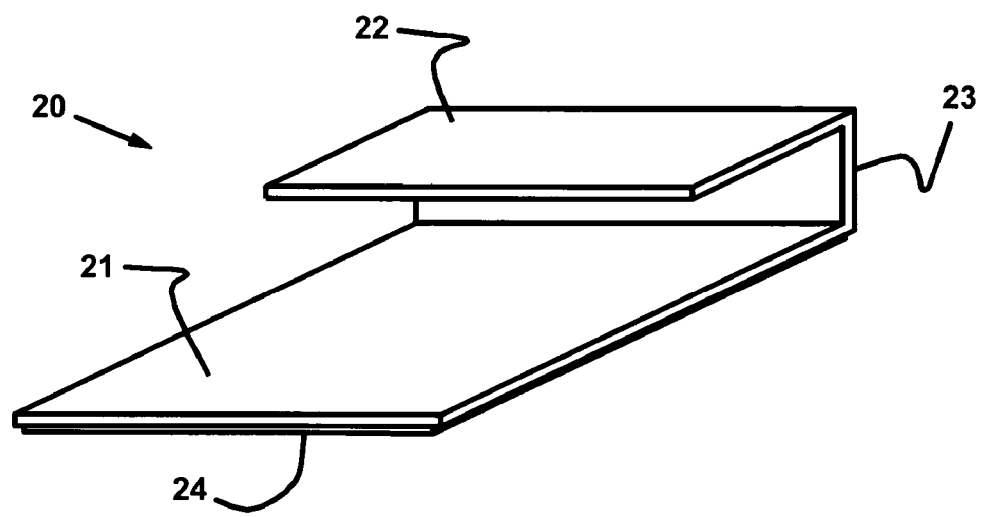

FIGS. 3 and 4 show embodiments of a J-clip according to the invention.

Briefly, one embodiment of the clip includes two plates that preferably are substantially parallel, a spacer that connects the plates and that holds the plates apart by a gap, and at least one part of a hook-and-loop (e.g., Velcro® brand) fastener attached to at least one of the plates opposite the other of the plates.

Thus, FIG. 3 shows J-clip 10 that includes substantially parallel plates 11 and 12 and spacer 13. In alternative embodiments, the plates need not be parallel. The plates are both connected together and held apart by spacer 13 so that the plates are separated by gap 14.

In FIG. 3, part 15 of a hook-and-loop (e.g., Velcro® brand) fastener is attached to plate 11. This part 15 can be the hook part or the loop part, although the "fuzzy" hook part is preferred. Part 15 is attached opposite the other plate 12, on an outer side of the J-clip.

The other plate, namely plate 12 in FIG. 3, has a rubberized coating 16. This coating can be useful in some circumstances, for example when J-clip 10 is used on ice. When used on ice, the coating can help reduce ice melt from contact with the J-clip.

In alternative embodiments, the rubberized coating is not included. Instead, either no coating or some other type of coating is used on plate 12 or on the entire J-clip. Another part of a hook-and-loop fastener also could be used on plate 12.

Plates 11 and 12 and spacer 13 can be formed from a single piece of material such as a steel plate. Preferably, at least a ¹⁄₁₆ inch thick steel plate is used. Alternatively, the plates and spacer can be formed from separate pieces of material joined together, for example by welding. The J-clip also can be made from a material besides steel, for example plastic or any other suitably strong material.

In FIG. 3, the two plates are square or rectangular shaped. While this is the preferred embodiment, any shape can be used for the plates. Also in FIG. 3, plates 11 and 12 are different sizes from each other. Alternatively, the plates can be the same size as each other.

Plates 11 and 12 preferably each have a surface area of several inches. For example, for use with an ice cover, plate 11 can measure eight inches on a side, and plate 12 can measure three by eight inches. Another useful size is twelve inches on a side for plate 11 and four by twelve inches for plate 11. Other smaller or largos sizes can be used for various applications.

Spacer 13 preferably connects the two plates at an edge of each plate. The spacer can be flat as shown in FIG. 3 or can have some other shape.

In a preferred embodiment, the spacer holds the two plates so that the gap is one or more inches. In one embodiment that is suited for use with an ice cover, the gap can be two inches. Other sized gaps can be used and may be suited for different applications: for use in commercial or residential settings, the gap can be four inches; for use with stage decks, drum risers, patio decks, and billboard covers, the gap can be three inches; and for certain other uses, the gap can be 1⅝ inches. Smaller (including less than an inch) or larger gaps can be used for these and for other applications.

FIG. 4 shows a different view of a J-clip 20, including plates 21 and 22, spacer 23, and part 24 of a hook-and-loop (e.g., Velcro® brand) fastener. In FIG. 4, the rubberized coating has been omitted.

Figure 5:
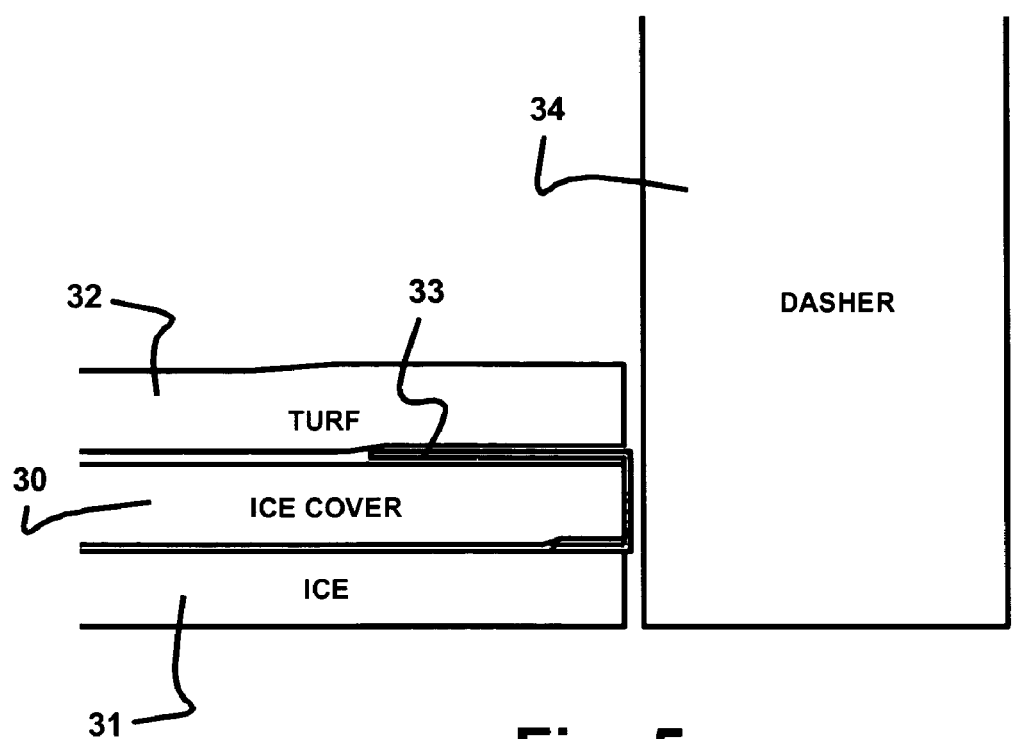
FIGS. 5 and 6 show turf placed on an ice cover using a J-clip according to the invention.
Figure 6:
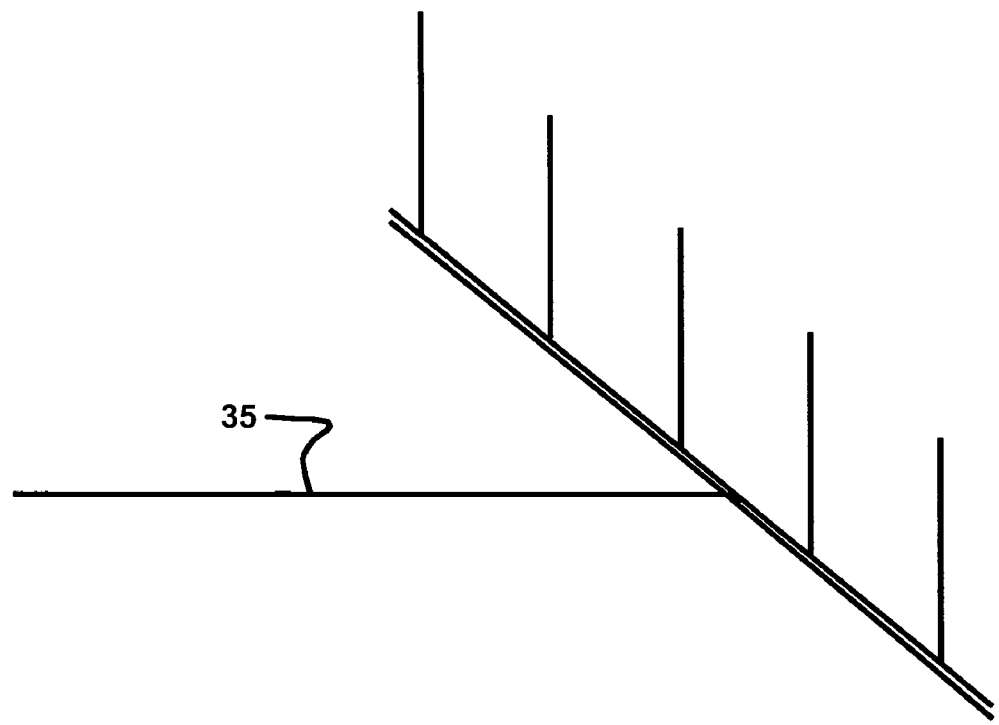

FIGS. 5 and 6 show turf placed on an ice cover using a J-clip according to the invention, for example either of the J-clips shown in FIGS. 4 and 5.

FIG. 5 shows ice cover 30 placed over ice 31, and turf 32 placed over ice cover 30. J-clip 33 has been fitted onto the edge of ice cover 30.

As discussed above, J-clip 33 includes at least part of a hook-and-loop (e.g., Velcro® brand) fastener. Turf 32 has the matching part of the fastener. Thus, turf 32 is attached to J-clip 33 via the fastener. This attachment helps to prevent sliding and bulging of turf 32, particularly at dasher 34 in FIG. 5 and along seam 35 in FIG. 6.

As shown in FIG. 5, The presence of the J-clip can cause a slight rise in the turf above the clip. For example, if the J-clip is made of ¹⁄₁₆ inch thick material, the rise will be ²⁄₁₆ inches. This slight rise tends not to even be noticeable.

FIGS. 7, 8, 9 and 10 show further variations on a J-clip according to different embodiments of the invention.

Figure 7:
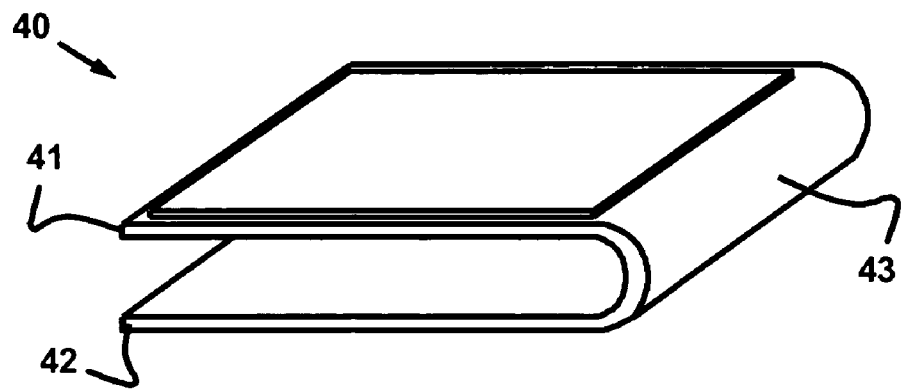
FIGS. 7, 8, 9 and 10 show further variations on a J-clip according to different embodiments of the invention.

FIG. 7 shows J-clip 40 that includes two same-sized plates 41 and 42. In addition, spacer 43 is curved in a semi-circle (with the inside of the semi-circle toward the gap). Any other shape of spacer can be used.

Figure 8:
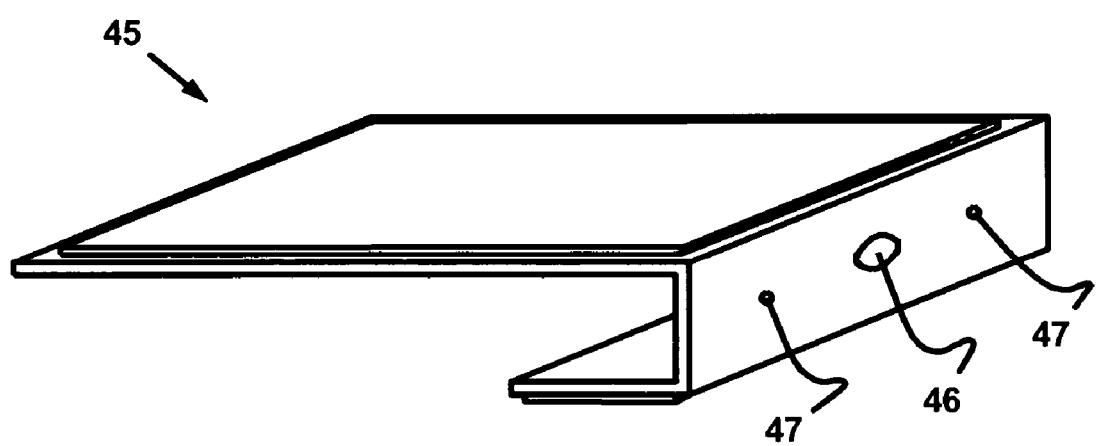

In use, the J-clips can be held in place by friction or gravity or by a tight fit. 5 Alternatively, the spacer can include one or more holes that can be used to secure the J-clip using nails or bolts. Thus, FIG. 8 shows J-clip 45 with bolt hole 46 and nail holes 47 for holding the J-clip in place. The bolt hole preferably is ⁵⁄₁₆ inch, and the nail holes preferably are ³⁄₁₆ inch. Other sizes and arrangements of bolt and/or nail holes can be used for the J-clip, as well as other techniques and structures for holding the J-clip in place (e.g., glue, epoxy, welding, another part of a hook-and-loop fastener on a different part of the J-clip, etc.).

Figure 9:
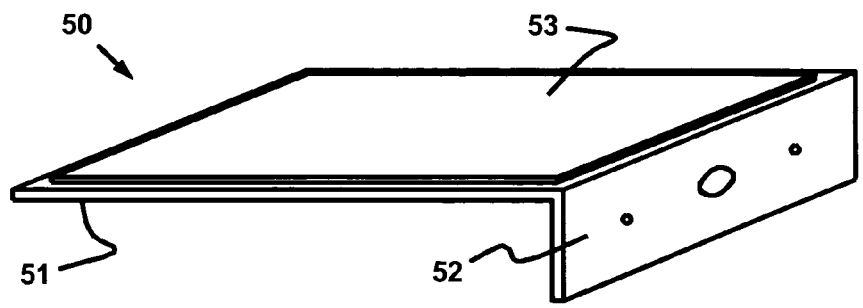

If structures are provided for attaching the clip to an object, then the clip can be constructed using only one plate. Thus, clip 50 in FIG. 9 includes plate 51, one or more structures 52 for fastening the plate to an object, and at least one part 53 of a hook-and-loop fastener attached to the plate. In FIG. 9, the structure for fastening the plate to an object is an extension with holes for nails or bolts. Other structures can be used without departing from the invention.

Figure 10:
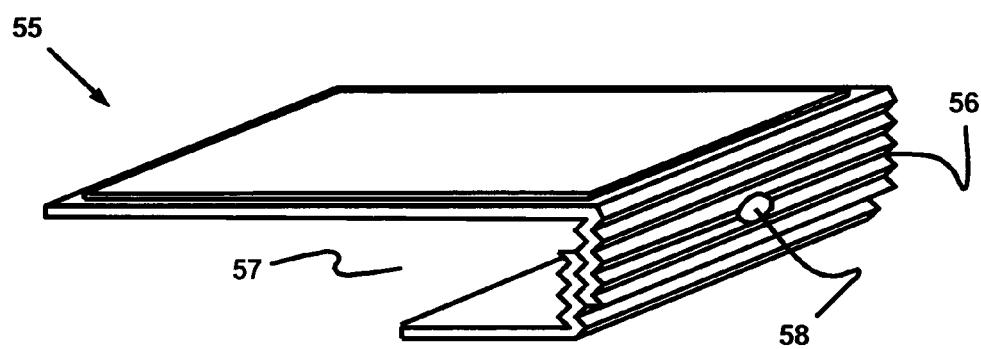

FIG. 10 shows J-clip 55 with spacer 56 that can be adjusted, permitting adjustment of the size of gap 57. In this embodiment shown in FIG. 9, spacer 56 has two pieces with ridges that can lock together at various positions. Then, a bolt or other fastening device can be placed through hole 58 to hold the parts of the spacer in place. Other arrangements can be used to make the spacer adjustable.

Each of the features of the various J-clips discussed above can be used with any of the other features shown in the Figures. For example, semi-circular spacer 43 of FIG. 7 can be used with a J-clip with differently-sized plate as shown in FIGS. 3, 4, 8 and 10. All other possible combinations of these features are within the scope of the invention.

Figure 11:
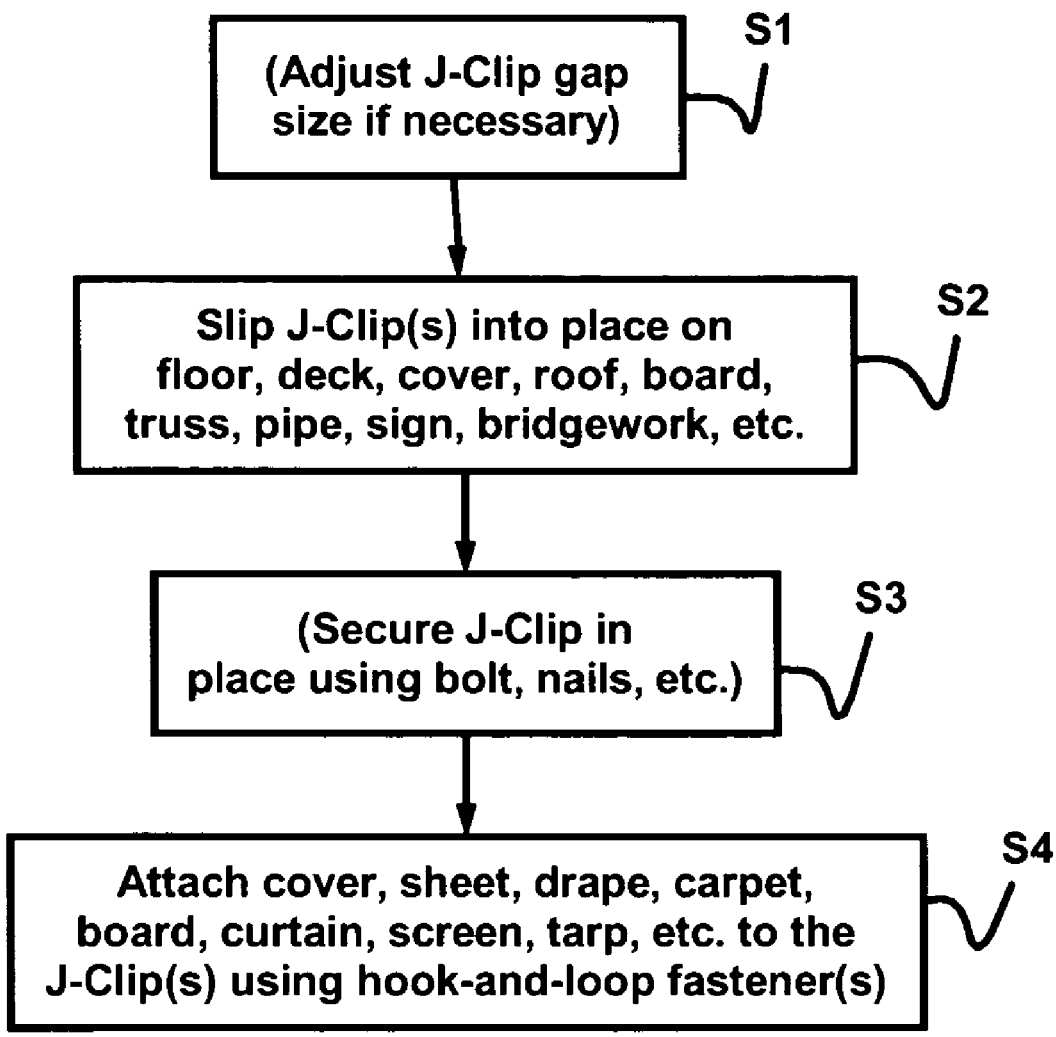
FIG. 11 is a flowchart for explaining use of J-clips according to the invention.

FIG. 11 is a flowchart for explaining use of J-clips according to the invention. While the steps in FIG. 11 are shown in a preferred order, a different order can be used and is within the scope of the invention.

In step S1, the J-clip is adjusted if possible and necessary. For example, if a J-clip as shown in FIG. 10 is used, the size of the gap is adjusted.

In step S2, the J-clip is slipped into place on a floor, deck, cover, roof, board, truss, pipe, sign, bridgework, or any other structure. If the J-clip can be fastened into place, for example using bolts or nails, this can be done in step S3.

The steps S1, S2 and S3 can be repeated for as many J-clips as necessary in order to hold whatever will be attached to them using the hook-and-loop fasteners.

In step S4, a cover, sheet, drape, curtain, board, screen, tarp, or other item is attached to the J-clip(s) via the hook-and-loop type fastener(s).

J-clips according to the invention are not restricted to use as described above with respect to FIG. 11—other uses are possible.

Uses

The J-clips of the invention can be used in a great variety of settings for a great variety of uses. These are illustrated in the following table:

TABLE

Uses of J-Clips

| Setting | Use |
| --- | --- |
| Indoor Arena | turf, staging, props, banners, signs, ice covers, turf covers, et al. |
| Outdoor Arena | turf, staging, banners, signs, turf covers, et al. |
| Entertainment | staging, trussing, video screens, curtains, drum risers, carpets, et al. |
| Theatre | curtains, carpet, props, cables, trussing, et al. |
| Roofing | covers, unfinished job protection, et al. |
| Construction | trussing, such as bridges, road signs and sign covers, curtains for bridge work and sandblasting, et al. |
| Household | carport, patio, lawn turf, gardening cover, et al. |
| Residential | Securing artificial turf and covers over lawns, sidewalks, et al. |
| Commercial | Securing artificial turf and covers over laws, sidewalks, runways, et al. |

The uses listed in the table are by way of illustration. The invention is not limited to these uses, and application of J-Clips to these and other uses would be apparent to one skilled in the art and would not require undue experimentation or further invention.

Alternative Embodiments

Although preferred embodiments of the invention are disclosed herein, many variations are possible which remain within the content, scope and spirit of the invention, and these variations would become clear to those skilled in the art after perusal of this application.

What is claimed is:

1. Clips and covering in combination with a floor, deck or arena cover, comprising:
   one or more of the clips, at least one of the clips further comprising two plates, a spacer that connects the plates and that holds the plates apart by a gap, and at least one part of a hook-and-loop fastener attached to at least one of the plates opposite the other of the plates, wherein the clips clipped to the floor, deck or arena cover; and
   a sheet or tarp attached to the clips via each clip's hook-and-loop type fastener;
   wherein at least one of the clips further includes a rubberized coating on the other of the plates without the hook-and-loop type fastener, opposite the part of the hook-and-loop type faster on the clip, said rubberized coating adapted to help prevent ice melt from contact with the clips when the floor, deck or arena cover is an ice cover placed over ice in a hockey arena.

2. Clips and covering as in claim 1, wherein for at least one of the clips, the plates are substantially parallel.

3. Clips and covering as in claim 1, wherein for at least one of the clips, the plates and the spacer are formed from a steel plate.

4. Clips and covering as in claim 1, wherein for at least one of the clips, the plates are square or rectangular shaped.

5. Clips and covering as in claim 1, wherein for at least one of the clips, the spacer connects the plates at an edge of each plate.

6. Clips and covering as in claim 1, wherein for at least one of the clips, the spacer includes one or more holes that can be used to secure the clip using nails or bolts.

7. Clips and covering as in claim 1, wherein for at least one of the clips, the spacer is adjustable so as to adjust the gap, and further comprising the step of adjusting the gap.

* * * * *